(12) United States Patent
Müller et al.

(10) Patent No.: US 12,161,528 B2
(45) Date of Patent: Dec. 10, 2024

(54) ATTACHING DENTAL IMPLANTS, DENTAL ABUTMENTS AND DENTAL SUPERSTRUCTURES TO EACH OTHER

(71) Applicant: Woodwelding AG, Stansstad (CH)

(72) Inventors: Andrea Müller, Winterthur (CH); Jörg Mayer, Niederlenz (CH)

(73) Assignee: WOODWELDING AG, Stansstad (CH)

( * ) Notice: Subject to any disclaimer, the term of this patent is extended or adjusted under 35 U.S.C. 154(b) by 1087 days.

(21) Appl. No.: 17/047,815

(22) PCT Filed: Apr. 17, 2019

(86) PCT No.: PCT/EP2019/059878
§ 371 (c)(1),
(2) Date: Oct. 15, 2020

(87) PCT Pub. No.: WO2019/201971
PCT Pub. Date: Oct. 24, 2019

(65) Prior Publication Data
US 2021/0169619 A1    Jun. 10, 2021

(30) Foreign Application Priority Data
Apr. 17, 2018 (CH) .................................... 00496/18

(51) Int. Cl.
*A61C 8/00*    (2006.01)
(52) U.S. Cl.
CPC .......... *A61C 8/0062* (2013.01); *A61C 8/0059* (2013.01); *A61C 2201/00* (2013.01)

(58) Field of Classification Search
CPC ....... A61C 5/005; A61C 5/098; A61C 5/0048; A61C 5/0051; A61C 5/0063; A61C 5/0065; A61C 5/70; A61C 8/005; A61C 8/098; A61C 8/0048; A61C 8/0051; A61C 8/0063; A61C 8/0065
See application file for complete search history.

(56) References Cited

U.S. PATENT DOCUMENTS

| | | | |
|---|---|---|---|
| 4,552,532 A | 11/1985 | Mozsary | |
| 5,122,059 A | 6/1992 | Dürr et al. | |
| 10,258,435 B2* | 4/2019 | Seo | A61C 8/0089 |
| 2004/0030341 A1* | 2/2004 | Aeschlimann | B29C 66/61 606/76 |
| 2004/0038178 A1 | 2/2004 | Mayer et al. | |

(Continued)

FOREIGN PATENT DOCUMENTS

| | | |
|---|---|---|
| DE | 10 2013 006 829 | 10/2014 |
| EP | 0015599 | 9/1980 |

(Continued)

OTHER PUBLICATIONS

English translation of Chinese Office Action dated Mar. 18, 2022, Application No. 201980026353.X, 9 pages.

*Primary Examiner* — Heidi M Eide
(74) *Attorney, Agent, or Firm* — Rankin, Hill & Clark LLP

(57) ABSTRACT

An approach for attaching a superstructure, such as a crown, to an abutment by an approach that includes causing thermoplastic material to become flowable due to mechanical energy input, and to flow relative to an attachment structure to secure the superstructure and crown together.

7 Claims, 10 Drawing Sheets

(56) References Cited

U.S. PATENT DOCUMENTS

| | | | | |
|---|---|---|---|---|
| 2010/0023057 | A1* | 1/2010 | Aeschlimann | A61F 2/4405 606/62 |
| 2010/0081110 | A1* | 4/2010 | Mayer | A61K 6/30 433/173 |
| 2013/0004917 | A1 | 1/2013 | Mayer et al. | |
| 2017/0209242 | A1 | 7/2017 | Kukunas et al. | |

FOREIGN PATENT DOCUMENTS

| | | | | |
|---|---|---|---|---|
| EP | 1 071 386 | | 1/2001 | |
| EP | 1 991 154 | | 9/2009 | |
| EP | 2893917 | A1 * | 7/2015 | A61C 13/225 |
| FR | 2 863 478 | | 6/2005 | |
| JP | 2005-538761 | A | 12/2005 | |
| WO | 2008/034276 | | 3/2008 | |
| WO | 2008/128367 | | 10/2008 | |
| WO | 2014/075200 | | 5/2014 | |

* cited by examiner

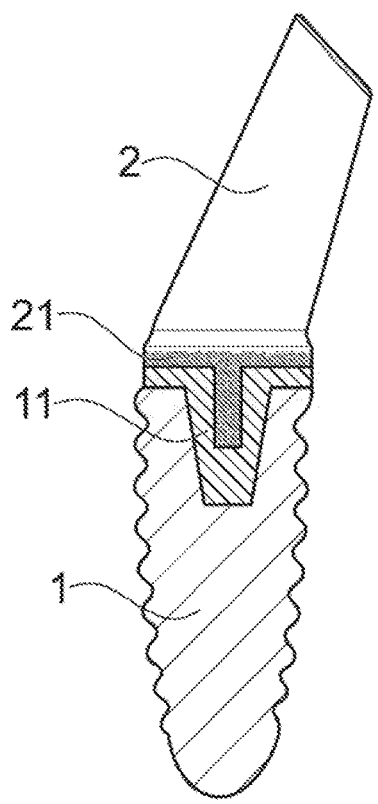
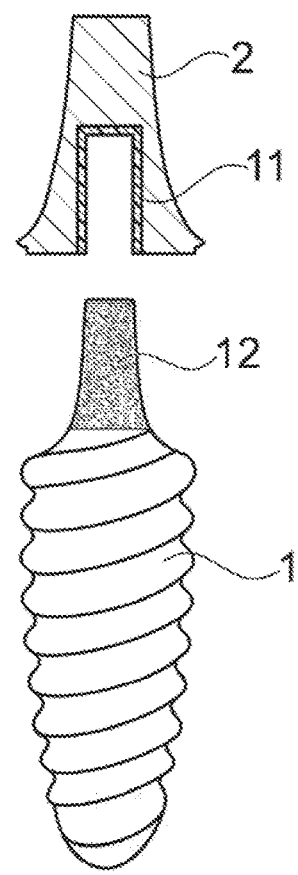
Fig. 1
Fig. 2
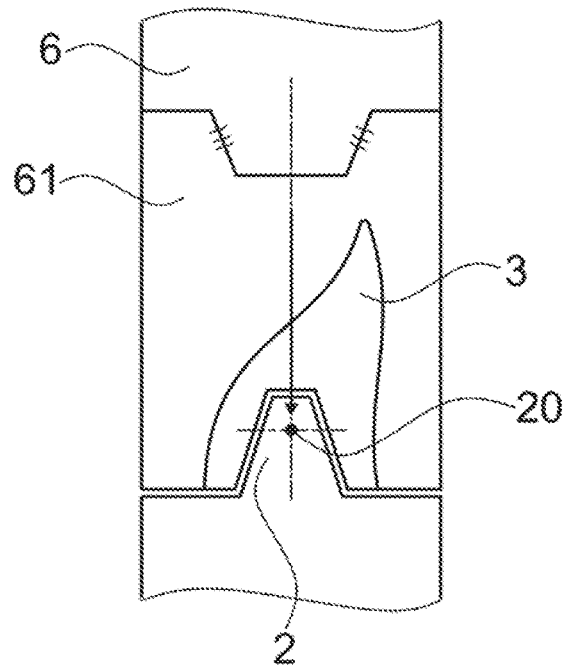
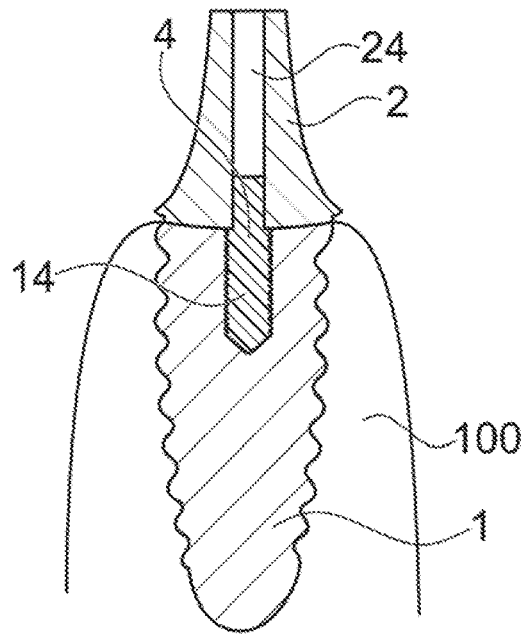
Fig. 3
Fig. 4

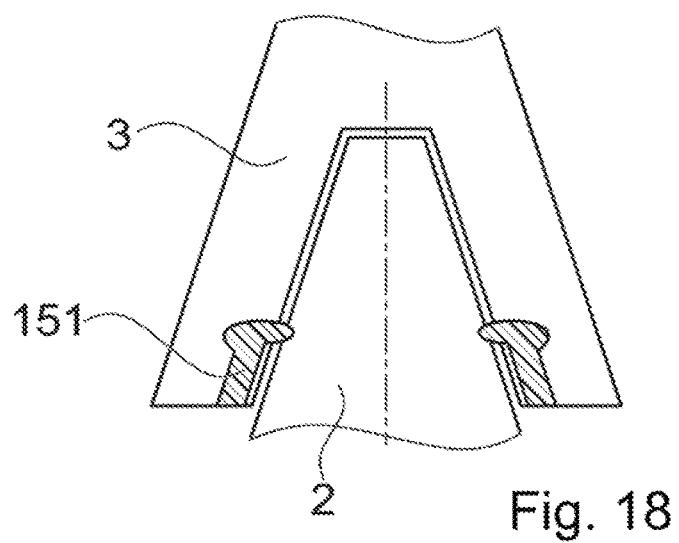
Fig. 18
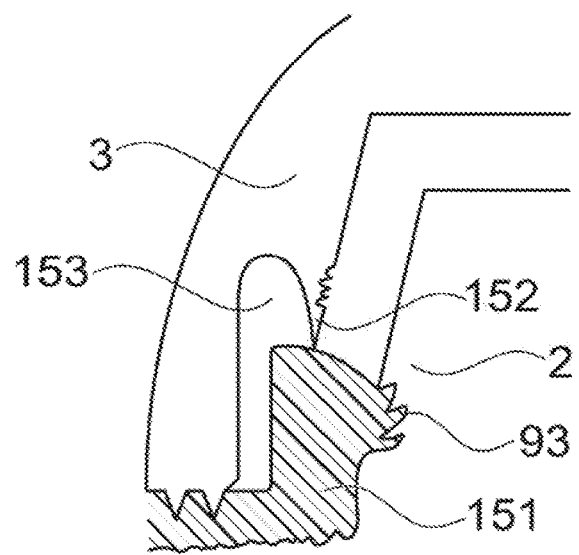
Fig. 19
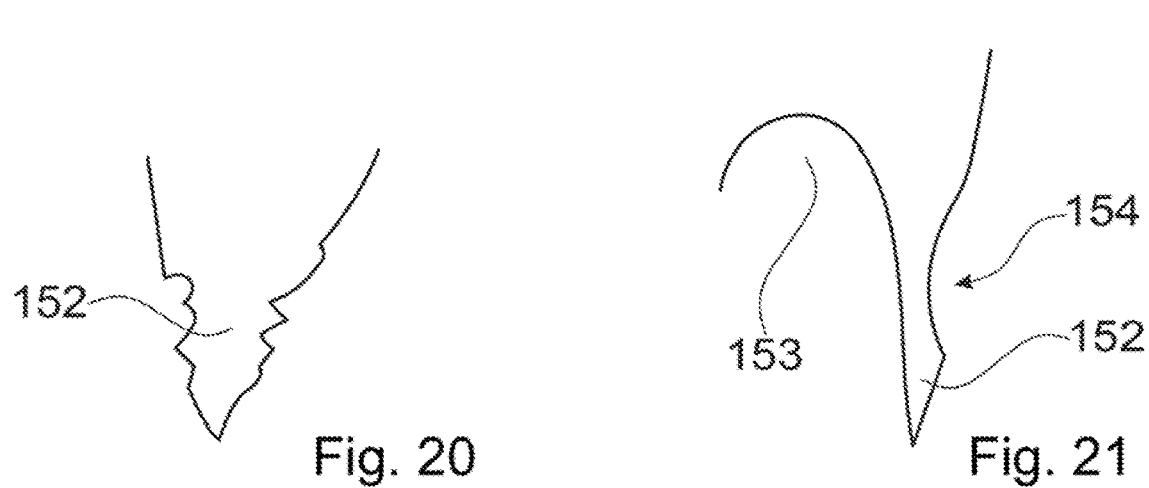
Fig. 20
Fig. 21

ATTACHING DENTAL IMPLANTS, DENTAL ABUTMENTS AND DENTAL SUPERSTRUCTURES TO EACH OTHER

FIELD OF THE INVENTION

The invention is in the field of dental implant systems and dental superstructures. The invention refers further to the fixation of different elements of prosthetic systems for dental restoration and in particular to the fixation of a superstructure to an abutment or an implant.

BACKGROUND OF THE INVENTION

Dental implant systems include one-piece dental implant systems and two-piece dental implant systems. One-piece dental implant systems comprise a one-piece dental implant with an enossal portion, a transgingival portion and a mounting structure for attaching a superstructure (such as an artificial tooth (crown) or denture) thereto. Two-piece dental implant systems comprise a dental implant that has an enossal portion and that may have a transgingival portion and that has an abutment mounting structure that allows fixation of an abutment thereto. An abutment is an intermediate piece that is fixable to the dental implant and that has a mounting structure for attaching a superstructure. While both, one-piece and two-piece dental implant systems have their advantages and disadvantages, two-piece dental implant systems are increasingly the more popular ones.

According to the prior art, for fastening an abutment to an implant in a two-piece implant system, there primarily exist the options of screwed connections and of glued connections. For fastening of a superstructure to a mounting structure (such as a post) of an abutment or of a dental implant of a one-piece implant system, glued connections are predominant.

WO 2008/34276 and WO 2008/128367 refers to fixation of different implants comprising two parts to be joint into bones using a thermoplastic material which may be liquefied by ultra-sonic vibration. Dental implant systems are not disclosed.

FR 2 863 478 describes a polymeric sheath surrounding a dental implant or the attachment post of an abutment. The sheath should be suitable to easily remove the dental prosthetic element once implanted. U.S. Pat. No. 4,552,532 refers to a dental implant system utilizing a root which is fixed to the jawbone. For cushioning forces applied to a crown a resilient member of plastic like material is provided between the dental implant and the abutment or a fastener used to fix the abutment onto the implant (a screw). Also DE 10 2013 006 829 describes a polymeric inlay between the thread of the dental implant and the thread of the abutment or the abutment screw. U.S. Pat. No. 5,122,059 discloses an intermediate retaining ring formed of a plastic material surrounding a fastening head (abutment) an a metal implant post to obtain a twist-resistant implant. EP 0 015 599 describes a soft layer, e.g. made of PMA within a dental implant. The polymeric layer surrounds a core and is covered by a third layer possessing rigidity similar to that of bone. The layering should cause tensile stresses in the supporting bone activating the self-sustaining and support mechanism of the bone.

There is no prior art known disclosing a fixation of a superstructure an an abutment which is easily removable without residual of the connecting material. The solution of the present invention should therefore provide a connection between an abutment and a superstructure being removable using plastic deformation induced by mechanical energy. The solution of the invention allows further to secure an additional fastener of the abutment against back movement.

SUMMARY OF THE INVENTION

It is an object of the present invention to provide an economical and reliable approach for fastening an abutment to an implant and/or for fastening a superstructure to a mounting structure of an abutment or implant of a one-piece implant system. The fastening approach may for example solve one or more of the following problems:

Provide an improved sealing between an implant and an abutment and/or between mounting structure and superstructure;
Provide an improved damping;
Reduce the stress concentration in the implant;
Provide a connection that can withstand all of tension (up to about 950 N), bending and torsional forces;
At least for some configurations, provide a reversible connection.
According to an aspect of the invention
a first piece has a first attachment structure defining a first undercut; and
and a second piece to be fastened to the first piece has a thennoplastic implant positioned to be brought into contact with the first attachment structure, the thermoplastic material capable of being liquefied by means of mechanical vibration, and of flowing relative to the first attachment structure whereby, after re-solidification, the second piece is fastened to the first piece by a positive fit connection due to the first undercut and/or
the second piece to be fastened to the first piece has a second attachment structure with a second undercut, and further a connecting piece is provided, which connecting piece has thermoplastic material capable of being liquefied by means of mechanical vibration, and of flowing relative to the first and second attachment structures whereby, after re-solidification, the second piece is fastened to the first piece by a positive fit connection due to the first and second undercuts into which the thermoplastic material has flown,
wherein the first and second pieces are two of
implant, and/or
abutment, and/or
superstructure.

The latter condition implies that the first piece is an implant and the second piece is an abutment or vice versa or the first piece is an implant and the second piece is a superstructure or vice versa or the first piece is an abutment and the second piece is a superstructure or vice versa. It is possible to transfer this concept to a three pieces, i.e. the first piece may be capable of being fastened to the second piece by this approach and at the same time a third piece may be capable of being fastened to the second piece by this same approach.

The invention covers both, implant systems and sets of at least two of
implant, and/or
abutment, and/or
superstructure
equipped for these approaches as well as according methods.

The invention further covers a set of at least one of
implant, and/or
abutment, and/or
superstructure and/or a thermoplastic connecting piece, together with an anchoring tool, for example sonotrode, equipped to couple mechanical vibration energy into the implant, abutment, superstructure and/or connecting piece for liquefying thermoplastic material of the implant, abutment, superstructure and/or connecting piece.

The implant further concerns a method of attaching a first piece to a second piece by an approach that comprises causing thermoplastic material to become flowable due to mechanical energy input, and to flow relative to an attachment structure to secure the pieces together as described in this text, wherein the first and second pieces are two of implant, and/or
abutment, and/or
superstructure.

The approach according to the invention provides a reversible connection in that the thermoplastic material that has interpenetrated the respective attachment structure may be re-heated, for example by a further mechanical energy input or by other energy input (such as by a heat source or laser), and thereby the connection may be detachable with little force. In embodiments, a remaining plastic deformability of the material may allow a mechanical detachment without damaging the structure of the implant system components or even tissue. The latter may especially be advantageous for connections of a provisionally fastened piece to be later, for example after a healing process, replaced by a definite piece, such as a definite abutment/definite superstructure.

The approach according to the invention is especially suited for systems with a not round cross sections. In other words, the respective attachment structure may not only have an undercut with respect to axial directions but, by having a not round cross section, may also yield a positive fit connection with respect to torsional movements.

According to a further aspect of the invention, the assembly comprises first piece, a second piece and a fastener, for example a fastening screw, for securing the second piece to the first piece. The assembly also comprises a thermoplastic connecting piece used for securing the fastener against loosening. Especially, the connecting piece may be used to fill an opening proximally of the fastener by thermoplastic material, whereby the fastener is reliably secured against backout and is also sealed. For this, thermoplastic connecting material may be at least partially made flowable by the impact of energy, especially mechanical energy, until the material flows relative to the fastener and embeds a portion of the fastener to prevent its loosening. Also in this aspect, the first and second pieces are two of implant, and/or
abutment, and/or
superstructure.

The present invention refers in particular to an assembly, comprising an abutment having a first attachment structure defining a first undercut; and a superstructure to be fastened to the abutment wherein the superstructure has a thennoplastic implant positioned to be brought into contact with the first attachment structure, the thermoplastic material capable of being liquefied by means of mechanical vibration, and of flowing relative to the first attachment structure whereby, after re-solidification, the superstructure is fastened to the abutment by a positive fit connection due to the first undercut or wherein the superstructure has a second attachment structure with a second undercut, and further a connecting piece is provided, which connecting piece has thermoplastic material capable of being liquefied by means of mechanical vibration, and of flowing relative to the first and second attachment structures whereby, after re-solidification, the superstructure is fastened to the abutment by a positive fit connection due to the first and second undercuts into which the thermoplastic material has flown.

The term "abutment" also called "prosthetic implant abutments", as used herein, refers to a connecting element between a dental implant and a superstructure. In a three piece implant the abutment can be fixed on the implant, e.g. with a screw butt joint. In a two piece implant the abutment is morse tapered or cold welded on the implant. A one piece implant incorporates the trans-mucosal abutment as an integral part of the implant. Abutments can be made from a variety of materials, such as titanium, surgical stainless steel and gold.

The term "superstructure", as used herein, refers to a dental prosthesis. Such a dental prosthesis is placed onto a protruding implant abutment. It is preferred that the superstructure is selected from the group consisting of or comprising: a crown, a bridge, a denture, a facial prosthesis, or an orthodontic anchor. The superstructure may be made of ceramic (such as Zirconium oxide), a metal, metal together with ceramic, or shaded powders of polymethylmethacrylate acrylic (PMMA) or high strength polymers like PEEK or glass or carbon Fiber reinforced PEEK.

The term "proximal" as used herein refers to the nearest to the point of attachment to the housing of an ultrasonic surgical instrument or respectively to the user of that instrument. The term "distal" as used herein refers to being situated away from the point of attachment to the housing of an ultrasonic surgical instrument or respectively to the user of that instrument. Thus, the distal end and the proximal end are opposite ends. The term "apical" as used herein refers to the direction towards the root tip(s) or apex of a tooth (or respectively the restoration), as opposed to "coronal", which refers to the direction towards the crown of a tooth or respectively a tooth restauration. The term "buccal" as used herein refers to the side of a tooth that is adjacent to (or the direction towards) the inside of the cheek or lips, as opposed to "lingual" (being oral), which refer to the side of a tooth adjacent to (or the direction towards) the tongue or palate, respectively, the oral cavity. The term "buccal" as used herein refers to all teeth (anterior and posterior), hence describes the vestibular surface of (or directions in relation to) anterior teeth.

One embodiment of the invention refers to an assembly, wherein the thermoplastic implant or the connecting piece having thermoplastic material is a thermoplastic pin or comprises a thermoplastic ring.

At times it may be necessary to remove crown restorations to enable treatment of the tooth tissue underneath, especially to enable for non-surgical endodontic treatment of a necrotic or previously-treated pulp. Several methods are available and the choice is guided normally by the nature and quality of the crown restoration, i.e., whether it is to be retained or to be replaced. The present invention provides assemblies comprising a superstructure, e.g. a crown and an abutment which allows easily removing of the superstructure from the abutment after permanent fixation. The superstructure may be removed by applying ultrasonic energy to a thermoplastic material used to form a positive fit connection between the superstructure and the abutment. The thermoplastic material can be removed without residuals an the abutment and the superstructure and without damage to these parts. This allows a reuse of both parts.

In case that the thermoplastic implant or the connecting piece having thermoplastic material is a ring or comprises a ring that ring may be used as a sealing of the space between the abutment and the superstructure. After complete installation of the assembly this ring should have a (tight) form closure to the superstructure and the abutment. Therefore the superstructure as well as the abutment may have attachment structures with an undercut to be filled by the thermoplastic material of the ring after liquefaction using mechanical energy. The ring may be pre-mounted and bonded to the abutment or the superstructure during manufacturing (thermoplastic implant) or may be provided as a separate part of the assembly (connecting piece having thermoplastic material). Each connecting piece being a separate part of the assembly has to be integrated between an abutment and a superstructure during the installation (implantation in the mouth of a patient) and subsequently be melted into the abutment and/or the superstructure. A thermoplastic implant being pre-mounted to an abutment or a superstructure has to be bonded to the corresponding part. Therefore, mechanical energy, like ultrasonic vibration, is used to liquefy the thermoplastic material which can flow into undercuts or empty spaces within attachment structures of the abutment and/or the superstructure.

In case that the thermoplastic implant or the connecting piece having thermoplastic material is a pin than the pin may either be pre-mounted and bonded to the abutment or the superstructure during manufacturing (thermoplastic implant) or may be provided as a separate part of the assembly (connecting piece having thermoplastic material). A separate pin may be introduced between the abutment and the superstructure during placement of the superstructure on the abutment or it may be introduced via an access hole in the superstructure after the placement on the abutment.

Therefore, one embodiment of the invention refers to an assembly, wherein the thermoplastic implant or the connecting piece having a thermoplastic material is a thermoplastic pin, wherein the abutment has a channel (an access hole) and the superstructure has a pocket and the channel allows access to the pocket, after the superstructure is positioned on the abutment (which means the second attachment structure is positioned to be brought into contact with the first attachment structure), and wherein the thermoplastic pin is capable of being introduced into the pocket.

The pocket, the undercuts or the empty space to be filled may be arranged to allow a lock of two degrees of freedom: movement of the superstructure in two directions (axial tension and pressure as well as rotation) should be prevented. One embodiment of the invention refers to an assembly, wherein the pocket comprises an empty space being formed like a cross or wherein the pocket is formed like a cross. The pocket, the undercut(s) or the empty space may extend into the direction of two different axis forming an angel and which can be perpendicular to each other.

It is preferred that the first attachment structure has an undercut around the channel being formed like a cross. The channel may further be located at the apical end of the superstructure. In addition, it is preferred that the channel is located lingual or buccal, wherein lingual is preferred.

Another embodiment of the invention refers to an assembly, wherein the thermoplastic implant or the connecting piece having thermoplastic material is a cup to be placed between the first and second attachment structure. Thereby the cup does not to be symmetrically but should fit to the attachment structure of the abutment, which can have the form of a truncated cone. This allows a minimization of the space between the abutment and the superstructure with circumferential contact of the thermoplastic material to the abutment and the superstructure. The cup and its elements may have a thickness of 0.2 to 1 mm.

It is preferred that the cup consists of an apical ring, a coronal ring and sticks (or stripes) connecting the apical and coronal ring. The sticks may have a height of 0.2 to 1 mm. It may be that only the coronal ring comprises the thermoplastic material so that locking takes only place on the top (coronal end) of the abutment. In this case it is preferred that the abutment or the superstructure comprises a surrounding groove to accommodate the coronal ring or respectively the liquefied material of said ring. The apical ring may be used either as supportive element to define the space between abutment and superstructure or as a sealing ring or to bolster (respectively positioning) the cup on a recess of the abutment.

The sticks may be made of a thermoplastic material, too. In this case the abutment and/or the superstructure may have furrows (notches or incisions) corresponding to the sticks (when the assembly is assembled the sticks fit into the furrows). These furrows can be located inside the superstructure and/or on the outside of the abutment. The depth of these furrows may be between 40 and 60% of the height of the sticks. The furrows can have a distance to each other between 0.4 and 2 mm. The furrows may have undercuts or are serrated. Liquefied, thermoplastic material of the sticks may flow into the empty space under the undercuts or the serrated structure and form a positive-fit connection.

Therefore, one embodiment of the invention relates to an assembly, wherein the abutment and/or the superstructure comprises furrows having at least one serrated surface and wherein the sticks fit into said furrows. Another embodiment refers to an assembly, wherein the abutment has a recess and the apical ring of the thermoplastic implant or the connecting piece having thermoplastic material fits into said recess. The recess is preferably a circumferential groove. Alternatively the abutment may have a ledge or shoulder on which the apical ring can be seated.

One embodiment of the invention refers to an assembly that is designed to allow a locking or fixation of the superstructure on the top of the abutment. One embodiment is an assembly, wherein the thermoplastic implant or the connecting piece having thermoplastic material comprises a pin with a (coronal) head region. The head region may be suitable to be fixed to the attachment structure of the superstructure. The apical end of the pin can be designed to be fixed to the attachment structure of the abutment. One embodiment of the invention refers to an assembly, wherein the head region comprises an energy directing structure at its coronal end. The energy directing structure may be designed as energy directing ribs on top of the head region. The energy directing ribs may extend parallel to each other. Alternatively protrusions, an edge, or a tip may have pronounced energy directing properties.

The connecting piece having the thermoplastic material may be fixed to the abutment (during manufacturing). The inventors could show that it is advantageously that the initial contact area between the connecting piece or pin and the superstructure is bigger than the initial contact area between connecting piece or pin and the abutment. Therefore, one embodiment of the invention relates to an assembly, wherein the abutment forms a counter face for liquefaction of the thermoplastic implant or the connecting piece having thermoplastic material and wherein the counter face has an energy directing structure to initiate melting and guiding flow of the liquefied thermoplastic material. A tip or a sharp edge may be used as energy directing structure. During an initial phase when the vibration is coupled into the assembly e.g. via the superstructure to the thermoplastic material of the connecting piece being in contact with the energy directing structure, such as a relatively sharp edge, the thermoplastic material is liquefied due to the energy directing properties.

In a three piece implant the abutment is commonly fixed on the implant with a screw butt joint. The screw needs to be tightened to a predetermined torque with a dental torque wrench. One problem occurring is screw loosening during chewing, which can often create a counter-clockwise torque on the implant-abutment interface, encouraging the abutment screw to come loose.

Another aspect of the invention refers to an assembly, wherein the thermoplastic implant or the connecting piece having thermoplastic material is further suitable to secure a fastener of the abutment, e.g. a screw. This assembly may further comprise the fastener, and/or the implant. It is preferred that the fastener, the implant and the connecting piece having thermoplastic material are equipped for the thermoplastic material, after re-solidification, to secure the fastener against at least one of an axial (back-out) movement of the fastener, a rotation of the fastener relative to the implant, and/or a variation of the angle of the fastener relative to the implant part. Further, the thermoplastic material can be decoupled using ultrasonic vibration from the connecting piece.

Another embodiment of the invention refers to an assembly comprising a dental implant, an abutment or a superstructure and a fastener, for example a fastening screw, for securing the abutment or the superstructure to the implant, wherein the fastener, the implant and/or the abutment/superstructure comprise a thermoplastic material and are equipped for the thermoplastic material, after re-solidification, to secure the fastener against an axial (back-out) movement. The assembly can also comprise a dental implant, an abutment or a superstructure and a fastener, for example a fastening screw, for securing the abutment or the superstructure to the implant and a thermoplastic connecting piece used for securing the fastener against loosening. Especially, the connecting piece may be used to fill an opening proximally of the fastener by thermoplastic material, whereby the fastener is reliably secured against backout and is also sealed. For this, thermoplastic material may be at least partially made flowable by the impact of energy, especially mechanical energy, until the material flows relative to the fastener and embeds a portion of the fastener to prevent its loosening.

The fastener can comprise a thread. Then, the relative movement between fastener and implant part is generated by screwing in the fastener, for example in the bone, in an inner thread of the implant part, such as the tulip, or in an inner thread of another implant part, for example the second implant part. In such embodiments, the connecting piece can prevent the loosening movement, this means the axial (back-out) movement of the fastener either by preventing the axial (back-out) movement in general, for example by forming a stop and/or a by rotation lock as described below.

In an embodiment, the fastener and the implant are designed for allowing a variation of the angle of the fastener relative to the implant, respectively the abutment or for preventing a variation of the angle of the fastener relative to the implant. In both cases, the thermoplastic material (the connecting piece, as the case may be), the fastener and the implant, can be designed for the thermoplastic material (the connecting piece, as the case may be), after re-solidification, to secure the fastener against an axial (back-out) movement.

In the embodiment allowing for a variation of the angle of the fastener relative to the implant or the abutment, the thermoplastic material (the connecting piece, as the case may be), the fastener and the implant, can be designed optionally for the thermoplastic material (the connecting piece, as the case may be), after re-solidification, to secure the fastener against said variation of the angle of the fastener relative to the implant.

In particular, the thennoplastic material (the connecting piece, as the case may be) can be deformable to a first state and to a second state, wherein the thermoplastic material (the connecting piece, as the case may be) in the first state secures the fastener against axial (back-out) movement and wherein the thermoplastic material (the connecting piece, as the case may be) in the second state secures the fastener against axial (back-out) movement and against variation of the angle of the fastener relative to the implant. Said securings can be established by the thermoplastic material in a direct or indirect manner. For example, the latter is the case if the thermoplastic material belongs to a connecting piece not consisting of the thermoplastic material, only.

Such an embodiment has the advantage that the surgeon can decide whether to allow for a variation of the angle of the fastener (e.g. screw) relative to the implant/abutment.

The thermoplastic material securing the fastener may belong to the fastener, the abutment or a connecting piece, used to connect the abutment to the implant or a superstructure to an abutment. As an even further possibility, the thennoplastic material may initially belong to the sonotrode. One embodiment refers to an assembly comprising a fastener for an abutment or a superstructure comprising a thermoplastic material at its coronal end, in particular at lateral sides of the coronal end. Another embodiment relates to securing the fastener using thermoplastic material initially belonging to the sonotrode wherein the abutment has undercuts into which the thermoplastic material may flow to secure, after re-solidification, the fastener within the abutment. There may also be a lateral area of the abutment or the superstructure (securing structure), in particular in a side of the opening for the fastener, being serrated comprising an open porosity or corrugation, a thread or similar, that may form an undercut with respect to axial directions, to be filled by the thermoplastic material, after re-solidification, to secure the fastener to the abutment or the superstructure. Such structures are options also for the embodiments with the thermoplastic material belonging to the fastener or being provided as separate element. The fastener may in addition have a material guiding protrusion that ensures a flow sideward into the undercut of the abutment.

The fastener can be positioned in a fastener receiving opening with the fastener axis running at an angle to the normal defined by the distal surface portion of the abutment/superstructure surrounding the fastener receiving opening, this means the fastener axis is not parallel to the longitudinal axis of the receiving opening. In a group of embodiments, a securing structure (empty space; undercut etc.) to be filled by thermoplastic material can be arranged at a wall of the fastener receiving opening within the abutment or respectively the superstructure and a fastener head can be equipped to guide thermoplastic material that is arranged or positioned an the distal end of the fastener head into the securing structure.

There may be channels to allow the flow of liquefied thermoplastic material from the fastener into the securing structure of the abutment or superstructure independent of the orientation angle of the fastener relative to the abutment and/or superstructure. In other words, the shape of the channels is designed to enable the flow of liquefied thermoplastic material from the channels into the securing structure over the whole range of possible angles between fastener axis and abutment top surface or the contact surface between abutment and superstructure.

In one embodiment, this ability of the channels is realized by channels having a bottom that is—at least in the region of their open ends—at a more distal position than a proximal end of the securing structure and an edge defining a distal end of the channel that is—at least partly—at a more proximal position than a distal end of the securing structure.

In particular, the arrangement of the securing structure and the design of the channels is such that the relative position of the channel bottom and the proximal end of the securing structure on the one hand and the channel edge and the distal end of the securing structure on the other hand keeps true for the whole range of possible angles between fastener axis and abutment top surface or the contact surface between abutment and superstructure.

The thermoplastic element within the fastener can comprise a plurality of protrusions designed for engaging with the plurality of channels. However, it may also be a ring-like thermoplastic element or a cap-like thermoplastic element without specific distal geometries being adapted to the channels.

Mechanical vibration or oscillation suitable for devices according to embodiments of the invention and according methods that include liquefaction of a polymer by friction heat created through the mechanical vibration has preferably a frequency between 2 and 200 kHz (even more preferably between 10 and 100 kHz, or between 20 and 40 kHz) and a vibration energy of 0.2 to 20 W per square millimeter of active surface. The vibrating element (sonotrode) is e.g. designed such that its contact face oscillates predominantly in the direction of the element axis (longitudinal vibration) and with an amplitude of between 1 and 104 tm, preferably around 40 to 80 !dm. Rotational or radial oscillation is possible also.

For specific embodiments of devices, it is possible also to use, instead of mechanical vibration, a rotational movement for creating the named friction heat needed for the liquefaction of the anchoring material. Such rotational movement has preferably a speed in the range of 10,000 to 100,000 rpm.

A further way for producing the thermal energy for the desired liquefaction comprises coupling electromagnetic radiation into one of the device parts to be implanted and designing one of the device parts to be capable of absorbing the electromagnetic radiation, wherein such absorption preferably takes place within the anchoring material to be liquefied or in the immediate vicinity thereof. Preferably electromagnetic radiation in the visible or infrared frequency range is used, wherein the preferred radiation source is a corresponding laser. Electric heating of one of the device parts may also be possible.

In this text the expression "thermoplastic material being liquefiable e.g. by mechanical vibration" or in short "liquefiable thermoplastic material" or "liquefiable material" is used for describing a material comprising at least one thermoplastic component, which material becomes liquid (flowable) when heated, in particular when heated through friction i.e. when arranged at one of a pair of surfaces (contact faces) being in contact with each other and vibrationally or rotationally moved relative to each other, wherein the frequency of the vibration is between 2 kHz and 200 kHz, preferably 20 to 40 kHz and the amplitude between 1 μm and 100 μm, preferably around 40-80 μm. Such vibrations are e.g. produced by ultrasonic devices as e.g. known for dental applications.

In this text, generally a "non-liquefiable" material is a material that does not liquefy at temperatures reached during the process, thus especially at temperatures at which the thermoplastic material of the fastener is liquefied. This does not exclude the possibility that the non-liquefiable material would be capable of liquefying at temperatures that are not reached during the process, generally far (for example by at least 80° C.) above a liquefaction temperature of the thermoplastic material or thermoplastic materials liquefied during the process. The liquefaction temperature is the melting temperature for crystalline polymers. For amorphous thermoplastics the liquefaction temperature is a temperature above the glass transition temperature at which the becomes sufficiently flowable, sometimes referred to as the 'flow temperature' (sometimes defined as the lowest temperature at which extrusion is possible), for example the temperature at which the viscosity drops to below $10^4$ Pa·s (in embodiments, especially with polymers substantially without fiber reinforcement, to below $10^1$ Pa·s)), of the thermoplastic material.

For example, a non-liquefiable material may be a metal, or ceramic, or a hard plastic, for example a reinforced or not reinforced thermosetting polymer or a reinforced or not reinforced thermoplastic with liquefaction temperature considerably higher than the liquefaction temperature of the liquefiable material, for example with a melting temperature and/or glass transition temperature higher by at least 50° C. or 80° C. or 100° C.

For being able to constitute a load-bearing connection, the thermoplastic material may have an elasticity coefficient of more than 0.5 GPa, preferably more than 1 GPa. The elasticity coefficient of at least 0.5 GPa also ensures that the liquefiable material is capable of transmitting the ultrasonic oscillation with such little damping that inner liquefaction and thus destabilization of the liquefiable element does not occur, i.e. liquefaction occurs only where the liquefiable material is at the liquefaction interface to the stop face. The plastification temperature is preferably of up to 200° C., between 200° C. and 300° C. or even more than 300° C. Depending on the application, the liquefiable thermoplastic material may not be resorbable. Depending on the configuration, however, also thermoplastic elastomers are an option for the thermoplastic material. These have the property of being capable of absorbing peak forces, for example when the patient bites hard items.

Specific embodiments of non-degradable materials are: Polyetherketone (PEEK Optima, Grades 450 and 150, Invibio Ltd), hard thermoplastic PU, Polyetherimide, Polyamide 12, Polyamide 11, Polyamide 6, Polyamide 66, Polycarbonate, Polymethylmethacrylate, Polyoxymethylene, or polycarbonateurethane (in particular Bionate® by DSM, especially Bionate 75D and Bionate 65D; according information is available an datasheets publicly accessible for example via www.matweb.com by Automation Creations, Inc.). An overview table of polymers and applications is listed in Wintermantel, page 150; specific examples can be found in Wintermantel page 161 ff. (PE, Hostalen Gur 812, Hochst AG), pages 164 ff. (PET) 169 ff. (PA, namely PA 6 and PA 66), 171 ff. (PTFE), 173 ff. (PMMA), 180 (PUR, see table), 186 ff. (PEEK), 189 ff. (PSU), 191 ff. (POM—Polyacetal, tradenames Delrin, Tenac, has also been used in endoprostheses by Protec).

The liquefiable material having thermoplastic properties may contain foreign phases or compounds serving further functions. In particular, the thermoplastic material may be strengthened by admixed fillers, for example particulate fillers that may have a therapeutic or other desired effect. The thermoplastic material may also contain components which expand or dissolve (create pores) in situ (e.g. polyesters, polysaccharides, hydrogels, sodium phosphates) or compounds to be released in situ and having a therapeutic effect, e.g. promotion of healing and regeneration (e.g. growth factors, antibiotics, inflammation inhibitors or buffers such as sodium phosphate or calcium carbonate against adverse effects of acidic decomposition).

If the liquefiable material is to be liquefied not with the aid of vibrational energy but with the aid of electromagnetic radiation, it may locally contain compounds (particlulate or molecular) which are capable of absorbing such radiation of a specific frequency range (in particular of the visible or infrared frequency range), e.g. calcium phosphates, calcium carbonates, sodium phosphates, titanium oxide, mica, saturated fatty acids, polysaccharides, glucose or mixtures thereof.

The pieces may (with the possible exception of the thermoplastic material, if the thermoplastic material belongs to at least one of the pieces) be of a metal, for example titanium or a titanium alloy. Alternatively, the pieces may be of ceramic, such as Zirconium oxide. Alternative materials are other metals like gold, stainless steel, or hard plastics such as PEEK etc. Combinations are possible, for example implants of metal combined with abutments and/or superstructures of ceramics.

Many superstructures or abutments used today are designed to be patient-specific. This means there is no common face to which a sonotrode may transmit ultra sound. Only embodiments where the superstructure comprises an access hole, e.g. for the connecting piece may be fixed with common sonotrodes, which fits into the access hole and can directly transmit ultra sound to the connecting piece.

Therefore the present invention refers to a set comprising a tool for applying ultrasonic vibration energy to a thermoplastic material, a superstructure or an abutment being specific to an individual patient and an intermediate piece having an apical end with a geometry adapted to the superstructure or the abutment and a coronal end suitable for coupling with the tool. The tool may be a sonotrode known in the art. To be able to transmit vibrational energy to a patient specific abutment or superstructure, the sonotrode can be used as set with an intermediate piece. This intermediate piece should an the coronal or proximal end have a structure suitable for coupling to the distal end of the sonotrode, e.g. a plug-in connection or a threaded connection. Thus the proximal end of the intermediate piece has a connecting element (such as a pin, a slit thread or a plug) allowing a generic coupling to a sonotrode. The apical or distal end of the intermediate piece should be adapted to at least one area of the surface or the coronal end of the patient-specific superstructure or abutment. This means the distal end of the intermediate piece has an individual interface, which may be the negative shape of the patient-specific contour of the superstructure or the abutment to be fixed.

To manufacture such an intermediate piece the data of a digital tooth imprint or the dimensions of a physical tooth imprint can be used. The intermediate piece may be designed using CAD (computer aided Design) software and can be made of high temperature polymers like PEEK or duromers. One embodiment of the invention refers to a set comprising a superstructure, an abutment or the assembly as defined herein. Another embodiment of the invention to a set, wherein the center of mass of the abutment is aligned with a central axis defined by the tool.

Another aspect of the invention refers to a method for attachment of a dental superstructure to an abutment comprising the following steps:

providing an assembly according to the present invention positioning the assembly parts an a dental implant with contact of the thermoplastic implant or the connecting piece having thermoplastic material capable of being liquefied by means of mechanical vibration to the first attachment structure or respectively to the first and second attachment structure, applying mechanical vibration to the thermoplastic implant or the connecting piece having thermoplastic material under conditions sufficient for liquefaction and for flowing of the liquefied material, and re-solidification of the liquefied material forming a positive fit connection to a first undercut or respectively to a first and second undercut.

Another embodiment of the invention refers to a method, wherein the first or the first and second undercut to be filled by the thermoplastic material after re-solidification is designed to prevent a relative movement of the superstructure and the abutment. A further embodiment of the invention refers to a method, wherein a fastener of the abutment used for fastening the abutment to a dental implant part is fixed by the liquefied material.

The present invention comprises further a method for removing a superstructure from an abutment comprising the steps of applying ultrasonic energy to a thermoplastic material used to form a positive fit connection between a superstructure and an abutment until the thermoplastic material is at least partially liquefied and detaching of the superstructure from the abutment. Said method refers in particular to removing of a superstructure from an abutment, wherein the superstructure and the abutment are parts of an assembly according to the present invention or wherein the superstructure is attached according to a method of the present invention.

BRIEF DESCRIPTION OF THE DRAWINGS

In the following, ways to carry out the invention and embodiments are described referring to drawings. The drawings are schematically. In the drawings, same reference numerals refer to same or analogous elements. The drawings show embodiments of the present invention.

FIG. 1 shows an assembly of an abutment and a dental implant with a connecting piece made of thermoplastic material as inlay.

FIG. 2 shows an assembly of an abutment and a dental implant with a connecting piece made of thermoplastic material as inlay.

FIG. 3 shows an assembly of an abutment, a crown and a sonotrode with an intermediate piece.

FIG. 4 shows an assembly of an abutment and a dental implant with a connecting piece made of thermoplastic material as a pin.

FIG. 18 illustrates a connecting piece in form of a ring used between abutment and superstructure.

FIG. 19 illustrates another connecting piece in form of a ring used to fix a superstructure on an abutment.

FIG. 20 illustrates a geometry of an attachment structure of an abutment or respectively a superstructure.

FIG. 21 illustrates another geometry of an attachment structure of an abutment or respectively a superstructure.

DESCRIPTION OF THE PREFERRED EMBODIMENTS

Figure 5:
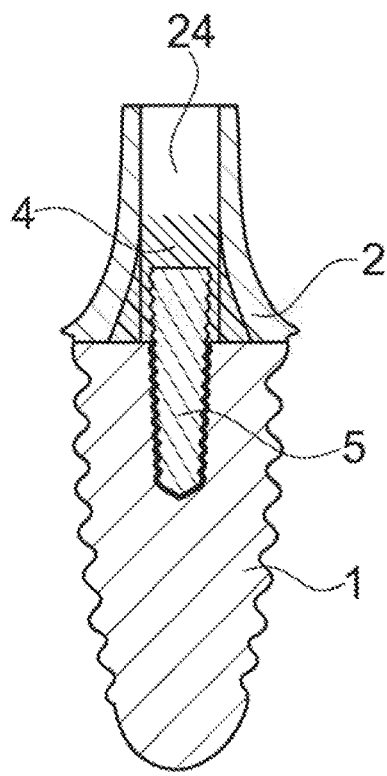
FIG. 5 shows another assembly of an abutment and a dental implant with a connecting piece made of thermoplastic material as a pin.

In the Figures, generally reference number 1 refers to an implant. The implant may have any suitable anchoring structure for being anchored in bone tissue, for example an outer thread or a pattern of ridges and indentations. In the figures, such anchoring structure is illustrated only schematically. The implant may belong to a one-piece implant system, or it may belong to a two-piece implant system, and thus require an abutment.

Reference number 2 refers to an abutment.

Reference number 3 refers to a superstructure, especially a crown, a bridge or a denture.

Generally, same reference numbers refer to same or analogous elements.

The assembly of FIG. 1 comprises a porous metal or ceramic structure 21 of the abutment 2. The assembly has an inlay 11 of thermoplastic material that has been attached to the implant 1 body already during manufacturing. Fastening of the implant is done by impinging mechanical vibration onto the abutment while the porous structure 21 is pressed against the thermoplastic material.

In addition or as an alternative to the abutment 2 comprising a porous structure 21, the implant 1 may comprise such porous structure 12 (FIG. 2), and/or the thermoplastic material inlay 11 may belong to the abutment 2 (FIG. 2), or the thermoplastic material may be provided as separate intermediate item. The porous structure may be only at the surface of the attachment structure of the implant or respectively the abutment. In addition a porous structure may also be part of the surface of an attachment structure of a superstructure or respectively the attachment structure of the abutment, suitable for the attachment of a superstructure to the abutment. Thickness of the thermoplastic inlay may be between 0.2-1 mm.

As illustrated in FIG. 3, the sonotrode 6 used may have a distal end or apical end with a geometry adapted to an element being specifically formed for an individual patient, such as the superstructure 3 (for example a crown, in other embodiments to the abutment). Especially the center of mass 20 of the abutment 2 may be aligned with a central axis defined by the sonotrode 6.

Alternatively, the sonotrode may be equipped with a for example custom manufactured, for example 3D printed, intermediate piece 61 adapted to the particular shape of the individually formed element. Such custom manufactured intermediate piece 61 may especially be advantageous if one of the pieces to be secured to each other has an irregular shape, such as the shape of a crown 3 (dashed lines) imitating the form of the dens to be replaced. Coupling between the body of the sonotrode 6 and the intermediate piece may for example be by a thread or other positive fit connection; alternatively the sonotrode body may be not entirely coupled and may hammer onto the intermediate piece.

FIG. 4 shows an implant 1 implanted in jawbone tissue 100 and an abutment 2.

The implant 1 has an attachment structure in the form of an attachment opening 14 with a thread, for example similar to conventional implants of two-piece implant systems with screwed connection. The abutment has a through hole 24, for example with an undercut (not shown in FIG. 4). For fastening, a thermoplastic pin 4 being a connecting piece is inserted into the aligned through hole 24 and attachment opening 14 and mechanical vibration energy impinges onto the thermoplastic pin 4 until material of the thermoplastic material flows into the undercuts and after re-solidification secures the implant 1 and the abutment 2 to each other.

In the variant of FIG. 5, a fastener, such as a threaded pin 5 of a dimensionally stable material, for example of a metal is secured to the attachment opening 14, and the positive fit connection is between the pin 5, the abutment 2 and the thermoplastic material of the thermoplastic pin 4 after introduction into the opening 24, liquefaction and re-solidification. Thereby, the stability of the connection with respect to bending forces is enhanced. In addition, the liquefied material of pin 4 secures the threaded pin 5 against an axial (back-out) movement.

Figure 6:
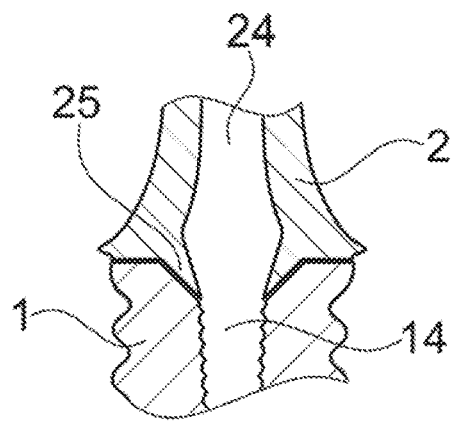
FIG. 6 shows the connection of an abutment to a dental implant.

FIG. 6 shows the possibility of a guiding structure 25, for example of the abutment 2, for better guidance/centering with respect to the implant 1. Such guiding structure of at least one of the pieces to be connected is an option for any embodiment.

Figure 7:
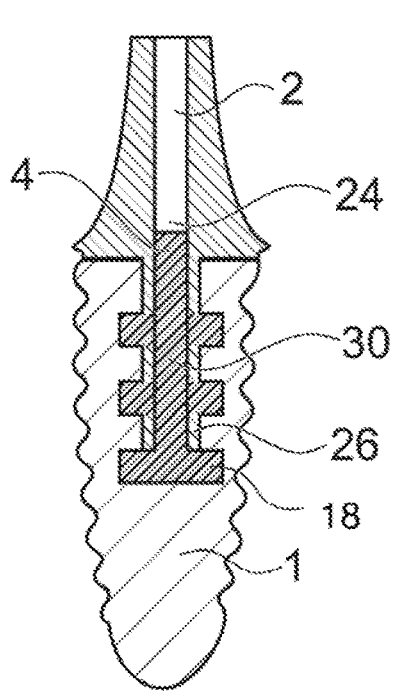
FIG. 7 shows an assembly of an abutment and a dental implant with a connecting piece made of thermoplastic material as a pin.

FIG. 7 shows an embodiment in which the abutment 2 has an attachment post 26 engaging into the attachment opening of the implant 1. The hole 24 (which may be a through hole or a longitudinal opening terminated towards apically in this embodiment) of the abutment reaches into the attachment post, and the attachment post 26 has a plurality of outflow openings through which thermoplastic material of the connecting piece 4 (especially thermoplastic pin; in this embodiment also a plurality of initially separate thermoplastic elements may be used) may flow out when the thermoplastic material is subject to energy input and a pressing force towards apically. The implant 1 may have, in the attachment opening, a plurality of undercuts 18 for receiving thermoplastic material that has flown out.

After the energy input and the re-solidification, the connecting piece 4 has a foot portion in the undercut 18 and crossbeams, whereby the connecting piece 4 secures the abutment 2 to the implant 1.

This embodiment, like other embodiments of the present invention, has the advantage that no circularly symmetrical structure and no regular polygon structure is required anywhere for the connection, in contrast for example to a thread. This increases the degrees of freedom.

The principle of thermoplastic material to be liquefied of the connecting piece (which optionally may be pre-assembled in the piece—for example abutment—with the longitudinal opening) within a post portion of solid material (as part of the piece to be fastened or of the connecting piece as such) with a longitudinal opening with outflow openings through which the liquefied thermoplastic material is pressed out to yield a positive fit connection with the piece around the post portion is called "inside-out" principle hereinafter.

Figure 8:
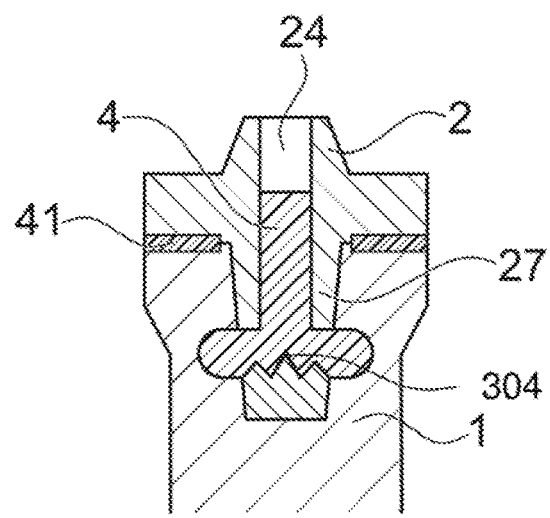
FIG. 8 shows an assembly of an abutment and a dental implant with a connecting piece made of thermoplastic material as a pin together with a sealing ring.

The embodiment of FIG. 8 is based an the inside-out principle and has the following additional features that are possibly independent of each other:

the attachment opening 24 and, fittingly, the attachment post 26 of an abutment 2 have a relatively steep cone 27. The opening angle of the cone is such that it serves for centering and for absorbing axial forces but not necessarily for blocking (no Morse cone).

A thermoplastic sealing pad 41, for example ring-shaped, serves for sealing the connection between the implant 1 and the abutment 2. Material of the sealing pad may be caused to be flowable during the attachment process (thermoplastic material). Alternatively, the sealing pad may be of an elastomeric material.

The opening 24 terminates apically, and the ground of the opening 24 has an energy directing structure 304.

Figure 9:
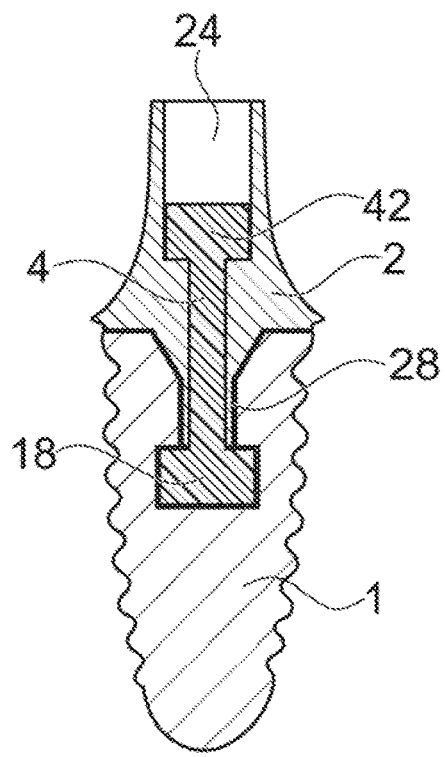
FIG. 9 shows another assembly of an abutment and a dental implant with a connecting piece made of thermoplastic material as a pin with a coronal head.

In FIG. 9, the abutment has an attachment post in the form of an attachment sleeve 28. The implant attachment opening has an undercut 18. The connecting piece 4 forms a head 42, and the opening 24 of the abutment forms a shoulder against which an apically facing portion of the head may lie. After the energy input and the re-solidification, the connecting piece 4 has a foot portion in the undercut 18, whereby the connecting piece secures the abutment 2 to the implant 1.

In the embodiments of FIGS. 4-9, the energy input may be done by a vibrating sonotrode that engages into the opening 24 of the abutment 2.

Figure 10:
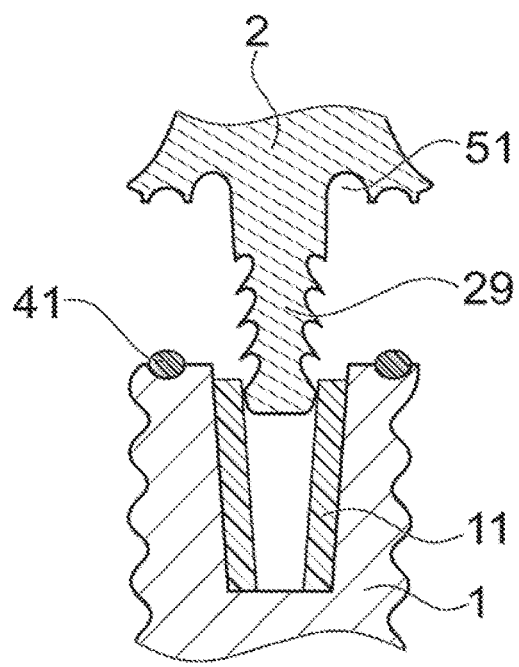
FIG. 10 shows an assembly of an abutment and a dental implant with a connecting piece made of thermoplastic material as inlay together with a sealing ring.

FIG. 10, similarly to the embodiment of FIG. 1 shows a connection that relies an the principle that the abutment 2 has an attachment structure defining an undercut, and the implant 1 or a separate connecting piece in form of an inlay 11 has thermoplastic material capable of being liquefied and flowing into the attachment structure.

The attachment structure of FIG. 10 belongs to an attachment post 29 engaging into the attachment opening of the implant. The attachment opening of the implant is lined by a thermoplastic inlay 11. The attachment post 26 is suitable for depth effective attachment and comprises a structure of grabbing teeth with indentations between them. For the purpose of centering, the abutment and the implant may comprise a centering cone, apically of coronally of the grabbing teach and inlay, respectively.

FIG. 10 also shows an overflow volume 51 for liquefied thermoplastic material portions flowing back as an effect of the hydrostatic pressure that arises when the abutment 2 is pressed into the implant 1. During the energy input and introduction of the attachment post 26 into the implant 1, the inlay 11 is at least partially liquefied, and the liquefied material flows under the grabbing teeth and into the overflow volume 51. FIG. 10 further shows a sealing ring 41.

Figure 11:
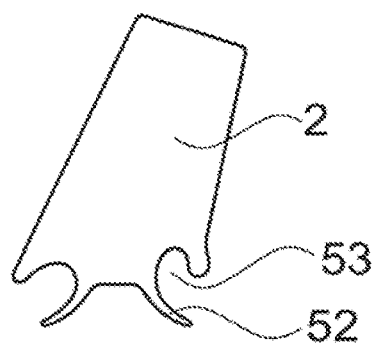
FIG. 11 illustrates a geometry of an attachment structure of an abutment or respectively a superstructure.

FIG. 11 depicts an alternative geometry of an attachment structure of an abutment 2 or respectively a superstructure 3, comprising an anchoring protrusion 52, for example running around a full circumference, and at least one pocket 53 for accommodating thennoplastic material to yield a positive fit connection with respect to axial directions.

Figure 12:
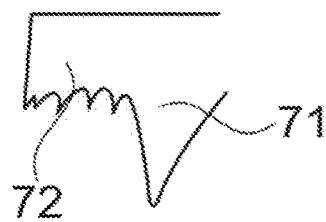
FIG. 12 illustrates another geometry of an attachment structure of an abutment or respectively a superstructure.
Figure 13:
FIG. 13 illustrates a further geometry of an attachment structure of an abutment or respectively a superstructure.
Figure 14:
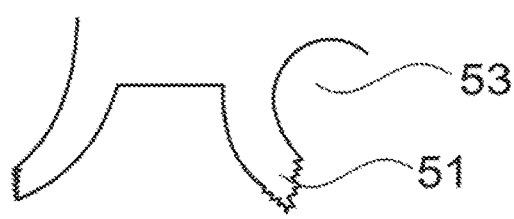
FIG. 14 illustrates a geometry of an attachment structure of an abutment or respectively a superstructure.

FIG. 12 shows a further part of an attachment structure, having an axial protrusion 71 that serves as mechanical lock, especially against lateral forces, and has a microstructured zone 72. FIG. 13 shows a modified attachment structure for an axial protrusion 73, the structure having at least one macroscopic undercut 74 to yield after interpenetration by thermoplastic material, additional stability against axial pulling forces. The attachment structure of FIG. 14 is similar to the one of FIG. 11 but with the anchoring protrusion 51 extending further into axial (here: apical) directions.

Generally, the attachment structures and principles taught for the connection between implant 1 and abutment 2 referring to FIGS. 1, 2 and 4-14 above is suitable also for an attachment of a superstructure to an abutment or, especially in a one-piece implant system, directly to an implant. Also, the overall arrangement shown in these figures may be reversed, for example the attachment structures of FIGS. 10-14 may not only belong to the abutment, with the implant or a separate connecting piece having thermoplastic material, but they may alternatively belong to the implant, with the abutment or a separate connecting piece having the thermoplastic material or to the abutment with the superstructure or a separate connecting piece having the thermoplastic material.

Figure 15:
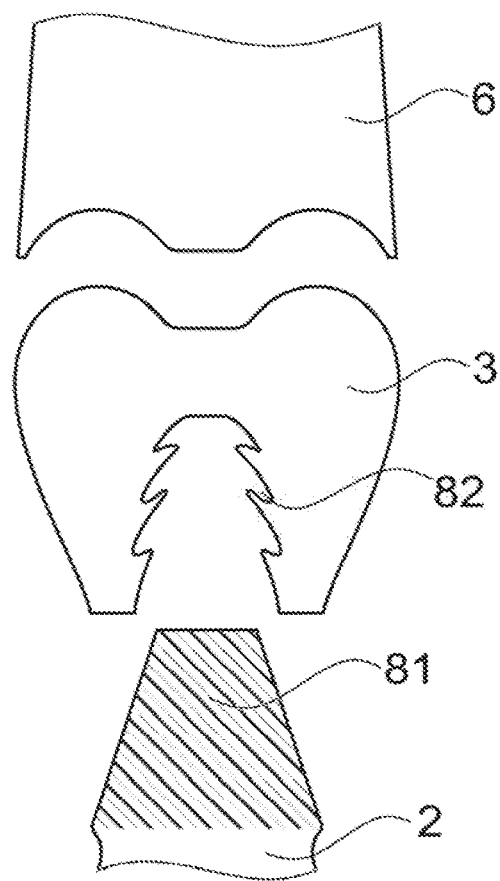
FIG. 15 shows an assembly of an abutment, a crown and a sonotrode.

FIG. 15 illustrates an arrangement of a superstructure 3 and an abutment 2 (or, functionally similarly, a coronal part of a one-piece system implant). The abutment 2 comprises a post consisting of or having a coating of a thermoplastic material 81, and the superstructure 3 comprises an attachment opening for the post to engage, the opening having attachment structures that define undercuts 82 into which the thermoplastic material may flow.

Figure 16A:
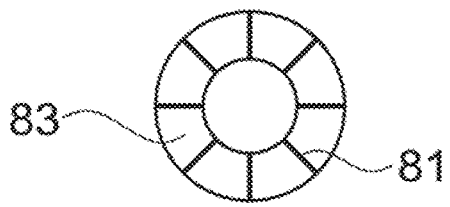
FIG. 16 illustrates a possible coating of a thermoplastic material an abutment: A top view; B side view
Figure 16B:
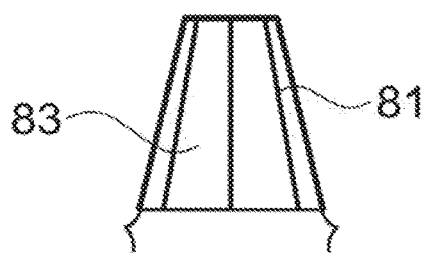

FIG. 16 illustrates the possibility that thermoplastic material 81 of the abutment may, as an alternative to a completely coating on a coronal part of the attachment post 83, also be present as partial coating only, whereby the energy needed for the attachment process is reduced.

Figure 17:
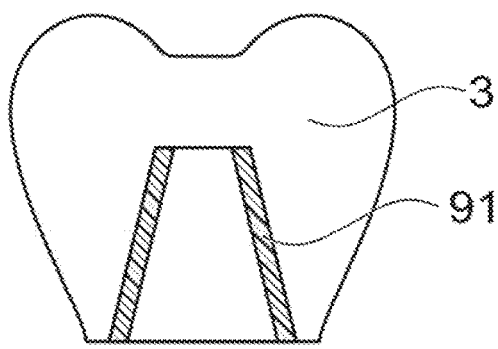
FIG. 17 illustrates a possible coating of a thermoplastic material inside of a superstructure, such as a crown.

In a reversed situation (FIG. 17), the superstructure 3 comprises the thermoplastic material 91 as a coating (interior coating of the attachment opening) and the abutment may have an attachment structure with an undercut. Both, a complete coating or a partial coating 91 are options.

FIG. 18 discloses the principle of an inlay between abutment 2/implant on the one hand and the superstructure 3 on the other hand, which inlay 151 is a sealing ring and/or holding ring. After the energy input and the re-solidification, the inlay 151 has a finger portion intruding into undercuts, whereby the inlay 151 secures the superstructure 3 to the abutment 2.

FIG. 19 shows a principle of a sealing ring. The sealing ring 151 extends around the Interface between the superstructure 3 and the abutment 2 (or implant), for example a periphery thereof. The assembly of the superstructure 3 and the abutment 2 define at least one—microscopic and/or macroscopic—attachment structure 93; 152 and define an overflow volume 153. In FIG. 19, the attachment structure of the superstructure 3 has an annular axial protrusion 152. The protrusion 152 may have a microperforation (FIG. 20) and/or a macroscopically undercut structure 154 (FIG. 21).

Such sealing ring may have double function:
Securing the superstructure to the abutment (or implant) by the positive-fit connection that results after thermoplastic material has interpenetrated the accordingly undercut structure(s); and
Sealing the Interface between superstructure and abutment (or implant) against bacteria and impurities, by having interpenetrated the named structures.

Such sealing ring may be provided as separate connecting piece or as belonging to the abutment/implant and/or superstructure. Also, it is an option also for the attachment of an abutment to an implant.

Figure 22:
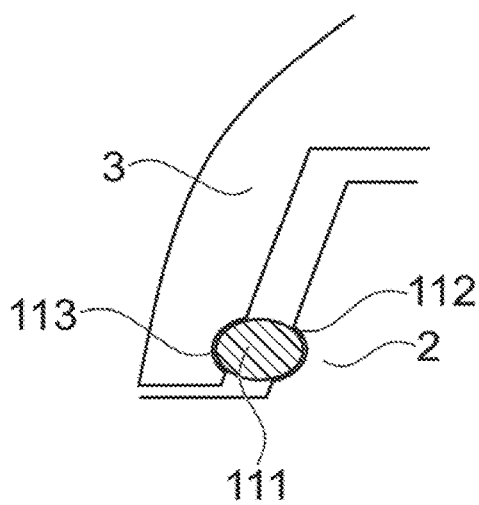
FIG. 22 illustrates a connecting piece in form of a ring used between abutment and superstructure.

FIG. 22 shows the option of a holding ring 11. Said holding ring may for example be provided for a releasable connection of one piece to another piece, such as of the crown 3 to an abutment 2/implant.

For the connecting, the attachment ring is placed into a slightly undercut structure (first groove 112) of one of the pieces, and the other piece (here with the second groove 113) is positioned. In these steps, the holding ring 111 is slightly deformed, mechanically, possibly assisted by energy input for temporarily softening the holding ring 111. After the energy input and the re-solidification, the holding ring 111 has a positive-locking fit to both pieces. The ring may be pre-mounted (during manufacturing) to any of the two pieces and is mounted to the other piece by energy input (using ultrasonic vibration) after positioning of both pieces. Alternatively, the ring 111 may be a separate element to be positioned between the pieces (abutment 2 and superstructure 3) and is melted to both using ultrasonic vibration. The attachment ring 111 may e.g. be made of polyurethane being rather elastic and suitable for wide gaps between both pieces such as common with provisionally attached superstructures. The ring 111 may also be made of PEEK being more suitable for permanently fixed superstructures having a lower gap.

Figure 23:
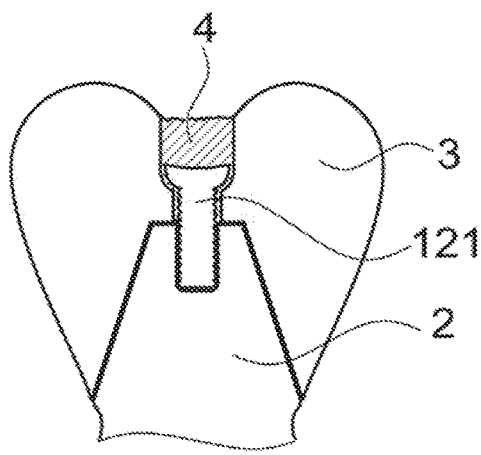
FIG. 23 illustrates a connecting piece securing a fastener used to fasten a superstructure on an abutment.

FIG. 23 shows a further principle of the present invention. A thermoplastic connecting piece 4 is used not directly or not only for mounting the superstructure 3 to the abutment 2/implant or the abutment to the implant, but for securing a for example conventional fastener against loosening. More in concrete, in the depicted embodiment, one piece (superstructure 3) is secured to the other piece (abutment 2 or implant) by a screw 121. The connecting piece is used to fill a gap proximally of the screw by thermoplastic material, whereby the screw is reliably secured against backout and is also sealed.

For securing, after placing and tightening the screw, the connecting piece 4 is placed in the opening of the superstructure 3 through which the screw 121 was accessible for tightening, and is subject to mechanical energy until at least a distal portion is essentially fully liquefied to embed the screw head. Portions of the connecting piece 4 that protrude proximally after the process may for example by removed mechanically.

Figure 24:
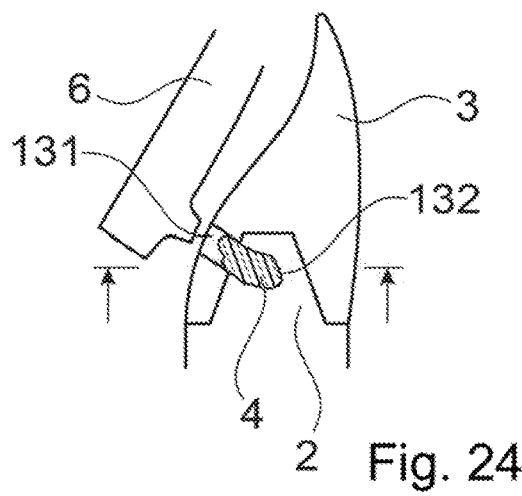
FIG. 24 shows an assembly comprising an abutment, a crown and a connecting piece in form of a pin introduced using an access hole in the crown.

FIG. 24 shows a further principle in which the superstructure 3 has an access hole 131, for example at a comparably apical position, and the abutment 2/implant has a pocket 132 accessible through the access hole 131 when the superstructure 3 is placed. The thermoplastic material of the connecting piece 4 is pressed into the pocket 132 with mechanical energy impinging until the material becomes flowable and is distributed along the interface between superstructure 3 and abutment 2/implant. The assembly may be such as to comprise a circumferential (or otherwise extended) hollow space that may be filled by the thermoplastic material. The hollow space may be provided by a groove within the abutment and/or the superstructure. The surface within the hollow space or respectively the access hole and the pocket, which form a continuous region may be micro-structured and/or be undercut with respect to at least one of the pieces to yield a positive fit connection. Optionally, at least one of the pieces (superstructure; abutment/implant) may comprise, along the space, thermoplastic material capable of being welded to the thermoplastic material.

As shown in FIG. 24, it may be advantageously, to use a device/sonotrode 6 being suitable for deflecting mechanical oscillations at an oscillation receiver location. To be able to impinge vibrational energy into a pin 4 used to fix a crown in the mouth of a patient it may be helpful to use a device which can be set into oscillation along a first axis and transmits such an oscillation into an oscillation along a second axis at an oscillation output location, wherein the first and the second axis form an angle (of 90-110°) to one another. Such devices are e.g. described in EP 1 991 154.

Figure 25:
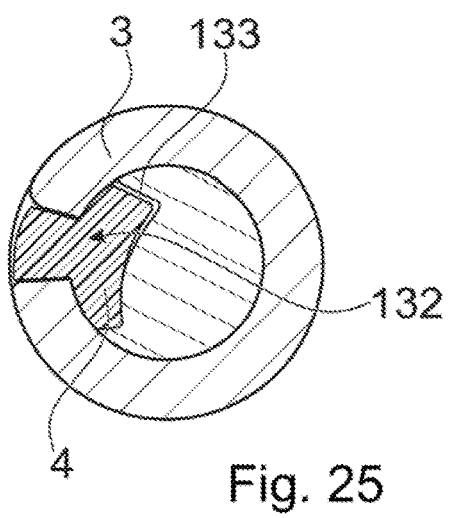
FIG. 25 shows a top view on a section of the embodiment of FIG. 24.

FIG. 25 shows a cut along the plane in FIG. 24 indicated by arrows and through the pocket 132 illustrating an empty space 133 into which thermoplastic material may flow.

Generally, the approach according to the invention is suited for connecting pieces that have engaging structures that are not necessarily circularly symmetrical. This may especially be advantageous for implant systems with implants that themselves are not circularly symmetrical but have shapes closer to the shapes of human teeth or their roots. The principles of the embodiments of FIGS. 15-25 may be applicable also for the attachment of an abutment to an implant.

Figure 26:
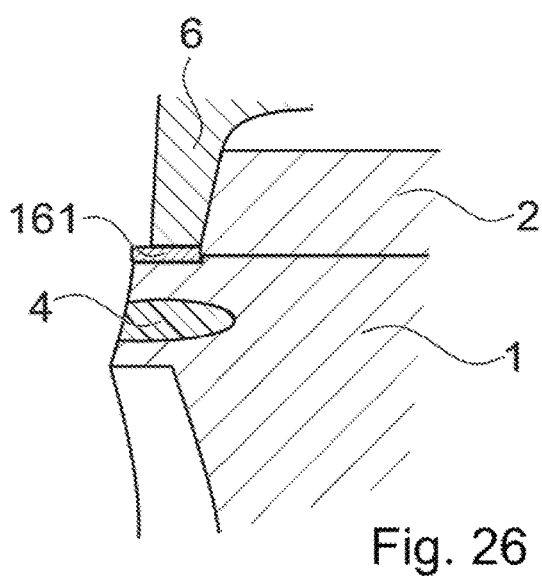
FIG. 26 shows an assembly comprising an abutment, a dental implant and a connecting piece together with a sonotrode.

FIG. 26 shows the principle of a ring-shaped inlay or connecting piece 4 applied to the connection of an abutment 2 to an implant 1. The sonotrode 6 in this may be pressed against a coronally facing shoulder 161 of the abutment 2 and does not necessarily have custom manufactured shape. A working height (height by which the proximal piece is advanced relative to the distal piece during the attachment process) may be 1-2 mm.

Figure 27:
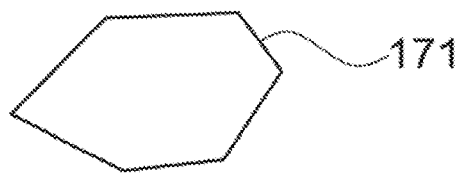
FIG. 27 schematically illustrates a horizontal cross section, for example of an attachment post.

FIG. 27 very schematically illustrates a horizontal cross section, for example of an attachment post, which cross section is hexagonal, with an irregular hexagon shape 171.

Figure 28:
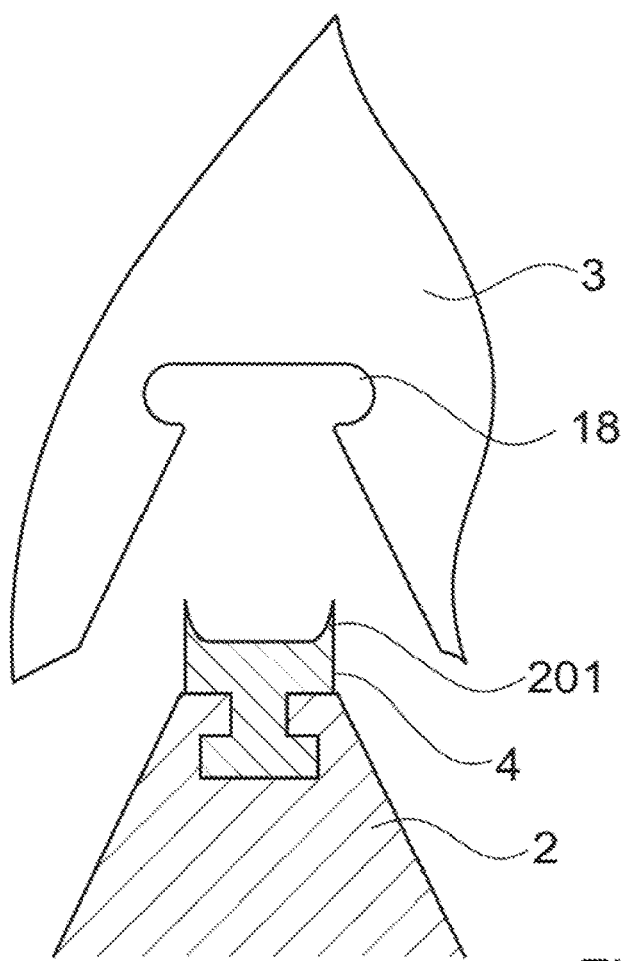
FIG. 28 shows an assembly of a superstructure, an abutment and a connecting piece of a thermoplastic material or comprising a thermoplastic material.

FIG. 28 shows an assembly of a superstructure 3 to be located on an abutment 2 and a connecting piece 4 of a thermoplastic material or comprising a thermoplastic material. The connecting piece 4 may be been attached to the abutment 2 during manufacturing. At its coronal end, the connecting piece 4 may have energy directing structures 201, here in form of peaks. The attachment structure of the superstructure 3 has undercuts 18 to be filled with liquefied, thermoplastic material which forms a positive-fit connection after re-solidification.

Figure 29:
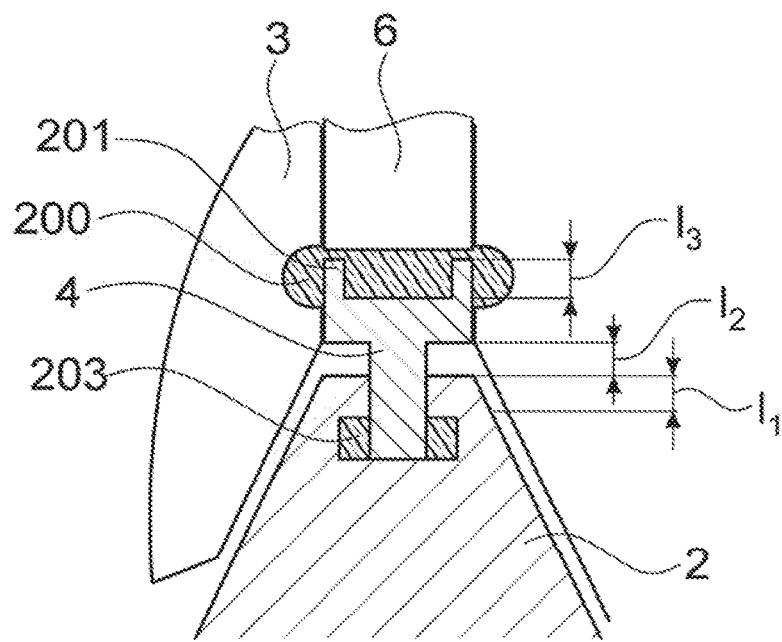
FIG. 29 shows another assembly of a superstructure, an abutment and a connecting piece of a thermoplastic material or comprising a thermoplastic material.

FIG. 29 shows another assembly of a superstructure 3 to be located on an abutment 2 and a connecting piece 4 of a thermoplastic material or comprising a thermoplastic material. In addition a sonotrode 6 is shown which is introduced into an opening (for introduction of a piece 4) of the superstructure 3 to impinge energy to the connecting piece 4. Alternatively, a sonotrode may be used which fits to the superstructure 3 not having an opening. The sonotrode 6 may have a connection to an intermediate element that has an apical end adapted to the individual shape of the superstructure 3.

The connecting piece 4 may have an apical end in form of a pin and a coronal head, which has energy directing structures 201, here in form of cuboids. The attachment structure of the superstructure 3 has undercuts 200 and the attachment structure of the abutment 2 has undercuts 203. The liquefied, thermoplastic material can flow into these undercuts to form a positive-fit connection after re-solidification. It is preferred that 11, 12 and 13 are chosen in a way (e.g. that the length 13 and the length 12 are smaller than the length 1i) to ensure that after energy input and re-solidification a thin gap (<0.1 mm) between the superstructure 3 and the abutment 2 remains. The superstructure should be fixed but it is preferred that the superstructure fits in a way to allow the superstructure 3 to vibrate under the forces acting while chewing.

Figure 30:
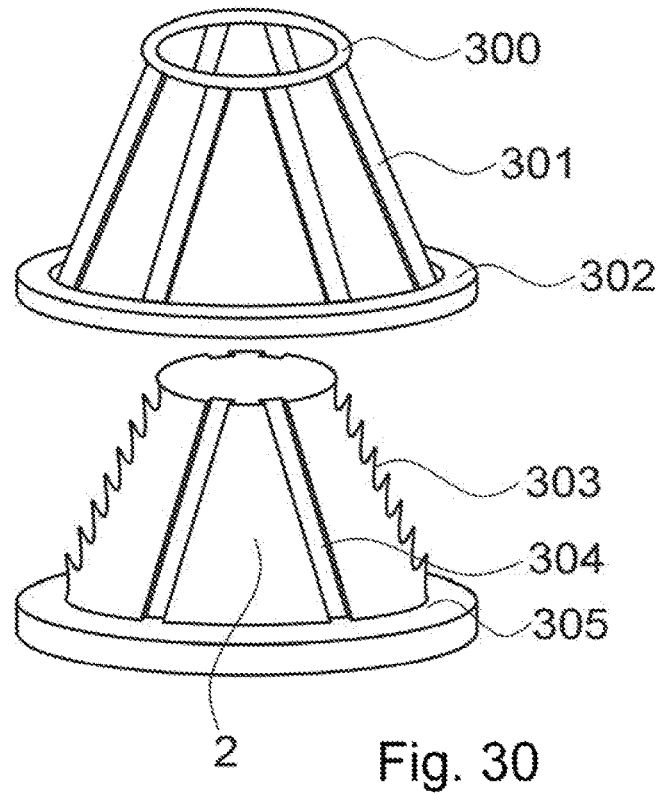
FIG. 30 illustrates a connecting piece in form of a cup and the fitting abutment structure.

FIG. 30 shows the attachment structure of an abutment 2 (lower part) and a connecting piece which may be entirely made of thermoplastic material, and comprises a coronal ring 300, connection bars 301 and an apical ring 302. The connecting piece can be put like a cup on the tapered attachment structure of the abutment 2. The coronal ring 300 can sit on the top of the abutment 2, the connection bars 301 can fit into furrows 304 of the abutment and the apical ring 302 may fit to a ledge 305 of the abutment 2. The apical ring 302 may serve as a sealing ring. Between the abutment 2 and a superstructure.

In one embodiment, at least one of the furrows 304 of the abutment may have a serrated surface (e.g. the lateral ones or the back wall) or consists of serrations 303. The serrations can be very small structures. In addition or as an alternative, a superstructure (not shown) to be fixed on the abutment 2 may have furrows with serrations or serrated structures, into which the connecting bars 301 can fit. The thermoplastic material of the connecting bars 301 may flow into the serrations and form a positive-fit connection. The connecting bars 301 may have a thickness of 0.2 to 1 mm and preferably of 0.4 to 0.7 mmm. The furrows 304 may have a depth of 0.1 to 0.35 mm. It is preferred that the depth of the furrows is between 40-60% of the thickness of the connecting bars 301. This ensures that after removing of the superstructure enough thermoplastic material of the connecting piece is left to allow a second positive-fit connection of the abutment and the superstructure.

The width of the furrows 304 may be between 0.2 to 1 mm and preferably of 0.4 to 0.7 mmm. There may be several furrows 304 in the abutment or the superstructure which can be located dose together. This reduces the damage to the thermoplastic material when the superstructure has to be removed, which can be made by ultrasonic vibration or mechanically (lever the superstructure off).

Figure 31:
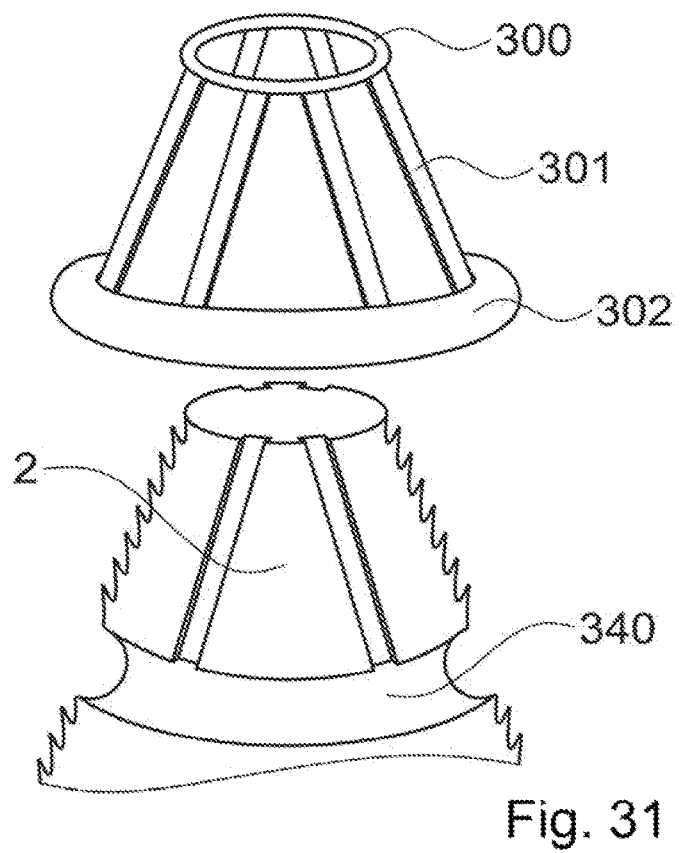
FIG. 31 illustrates another connecting piece in form of a cup and the fitting abutment structure.

FIG. 31 shows an embodiment similar to FIG. 30. The apical ring 302 of the connecting piece fits into a circumferential groove 340 in the abutment 2 to allow sealing of the space between the abutment 2 and a superstructure (nit shown).

The assembly as illustrated in FIGS. 30 and 31 allows a minimization of the gap between superstructure and abutment but allows circumferential contact in a static indeterminate system (e.g. ceramic structure on a ceramic/titan structure) which eliminates high peak loads. In addition, the connecting piece as described allows that the superstructure may be fixed in the same end position more than ones. It is not necessary to regrind the superstructure or the abutment. This is possibly because the thermoplastic material may be liquefied again (after re-solidification) so that the superstructure may be removed. Subsequently, one can use a new connecting piece to fix the superstructure again to the abutment having the same end position. Alternatively one can also use the "old" connecting piece in case that the connection bars have enough material left to be liquefied and forming a positive-fit connection during solidification.

Figure 32:
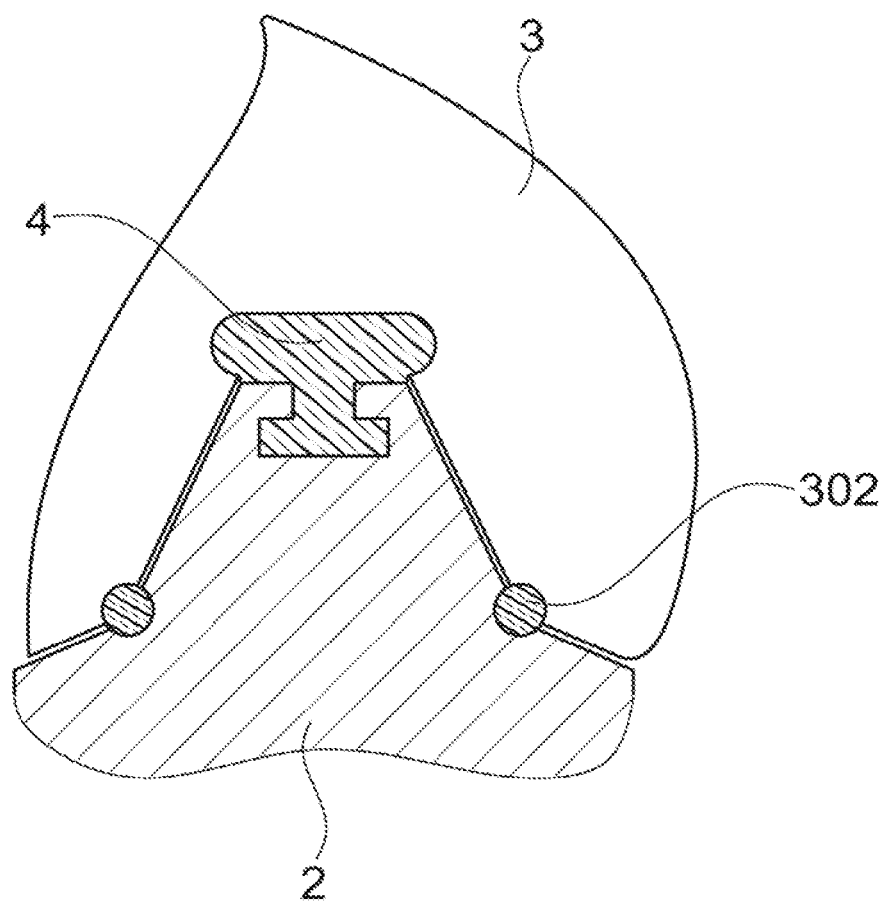
FIG. 32 shows an assembly of a superstructure, an abutment and a connecting piece of a thermoplastic material or comprising a thermoplastic material together with a sealing ring.

FIG. 32 shows an assembly of a superstructure 3, an abutment 2 and a connecting piece 4 similar to the one illustrated in FIG. 29. The assembly is shown after energy input, thus the connecting piece 4 has been partially liquefied and solidified again. The liquefied thermoplastic material has filled the undercuts in the abutment 2 and the superstructure 3, so that the longitudinal section evokes the picture of an anvil. Nevertheless, the cross section in a plane perpendicular to the section shown may be rather round or unstructured, or can be polygonal. In addition to the connecting piece 4 the assembly may comprise a sealing ring 302 comprising thermoplastic material which after being molten to the superstructure 3 and/or the abutment 2 seals the space between both pieces.

Figure 33:
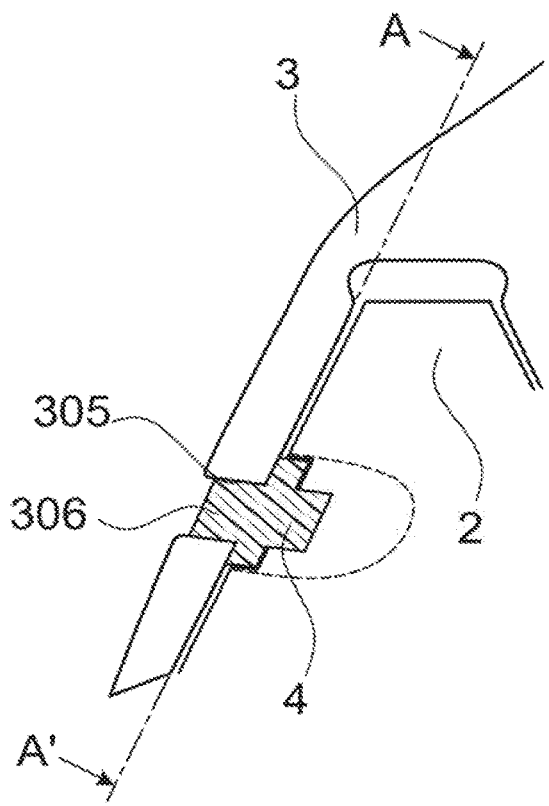
FIG. 33 shows an assembly of a superstructure, an abutment and a connecting piece of a thermoplastic material or comprising a thermoplastic material in form of a pin.

FIG. 33 shows another assembly of a superstructure 3 to be located on an abutment 2 and a connecting piece 4 made of a thermoplastic material or comprising a thermoplastic material. The superstructure 3 has an access hole 305, preferably at an apical end of the superstructure, and the abutment 2 has a pocket accessible through the access hole 305 after the superstructure 3 is placed on the abutment. The thermoplastic material of the connecting piece 4 in form of a pin can be introduced into the pocket. The opening 305 allows further to use a tool for impinging mechanical energy to the pin 306 until the thermoplastic material liquefies at least partially and flows along the interface between superstructure 3 and abutment 2 into an empty space created by at least one undercut, here an undercut of the abutment 2. The surface along the interface, within the undercut, the access hole and/or the pocket, which form a continuous space may be micro-structured. Optionally, at least one of the pieces (superstructure or abutment) may comprise, along the space, thermoplastic material capable of being welded to the thermoplastic material of the pin 306.

Figure 34:
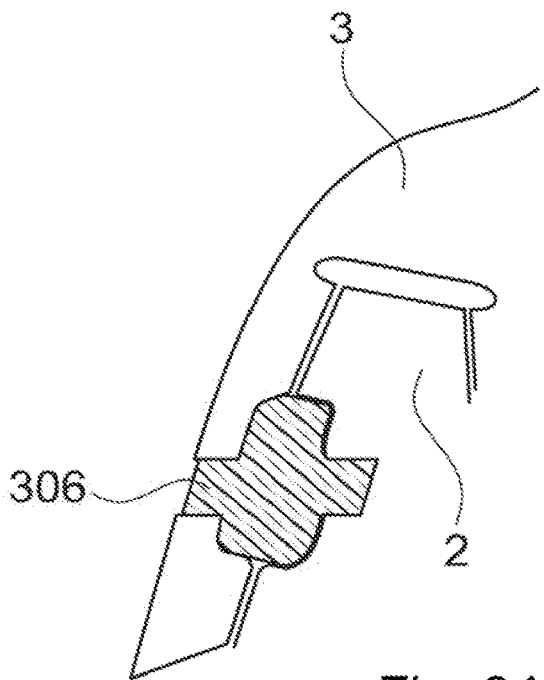
FIG. 34 shows another assembly of a superstructure, an abutment and a connecting piece of a thermoplastic material or comprising a thermoplastic material in form of a pin.

FIG. 34 shows an assembly being very similar to the assembly of FIG. 33. In this embodiment also the superstructure 3 has undercuts which may be filled by the liquefied material of the pin 306. One may also introduce more than one pin and subsequently use ultrasonic energy for liquefaction in case that more liquefied material is needed. In addition, FIG. 34 illustrates that the undercuts do not have to be symmetric. The geometry of the empty space to be filled or respectively the undercuts may be chosen to allow a lock of two degrees of freedom: axial tension (and pressure) as well as rotation.

Figure 35:
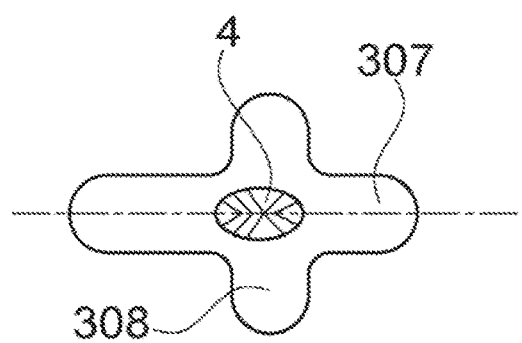
FIG. 35 shows a top view an a section A-A' of the embodiment of FIG. 33.
Figure 36:
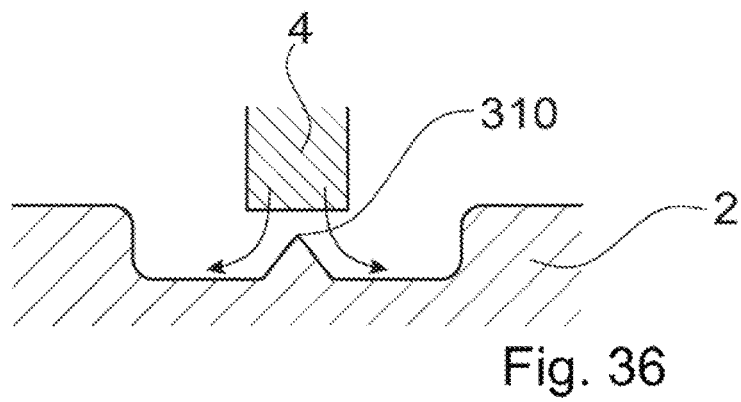
FIG. 36 illustrates a contact area of an abutment with an energy directing structure.

One example is shown in FIG. 35. FIG. 35 shows the view onto the section along A A' in FIG. 33. The connecting piece 4 in form of a pin has been liquefied using ultrasonic vibration so that the thermoplastic material has been able to flow interface between superstructure 3 and abutment 2 into an empty space arranged in a way to have a cross section protruding in at least two different direction 307, 308, e.g. forms a cross. This allows a lock of two degrees of freedom. FIG. 36 shows exemplarily that the attachment structure of the abutment 2 may comprise an energy directing structure 310, which may be a peak or a sharp edge. This allows to control where the connecting piece 4 (e.g. a pin) liquefies first. It may be preferred that a connecting piece may first liquefy at the bottom of a groove, a channel or longitudinal bore within the abutment 2 and only later at the interface between the pin 4 and a superstructure. In addition the energy directing structure 310 may also be suitable to direct the flow of the thermoplastic material (see arrows). By arranging the energy direction structure 310 asymmetrically (not in the middle of the bore, groove or channel), it is possible to direct different portions of liquefied material into different directions or into undercuts/empty spaces having different size.

What is claimed is:

1. An assembly, comprising
    an abutment having a first attachment structure defining a first undercut; and
    a dental superstructure to be fastened to the abutment;
    wherein the dental superstructure has a second attachment structure with a second undercut, and further a separate connecting piece is provided, said separate connecting piece has thermoplastic material capable of being liquefied by mechanical vibration, and of flowing relative to the first and second attachment structures and into the first and second undercut, wherein the separate connecting piece having thermoplastic material is a cup fitting between the first and second attachment structure, and wherein the cup consists of an apical ring, a coronal ring and sticks connecting the apical and coronal ring;
    whereby, after re-solidification, the dental superstructure is fastened to the abutment by a positive fit connection due to the first and second undercuts into which the thermoplastic material has flown.

2. The assembly according to claim 1, wherein the dental superstructure is selected from the group consisting of a crown, a bridge, a denture, a facial prosthesis, and an orthodontic anchor.

3. The assembly according to claim 1, wherein the first attachment structure defining the first undercut and/or the second attachment structure with the second undercut is designed to have grooves having at least one serrated surface, wherein the at least one serrated surface comprises the first or second undercut and wherein the sticks fit into said grooves.

4. The assembly according to claim 1, wherein the first attachment structure defining the first undercut is designed to comprise a recess and the apical ring of the connecting piece having thermoplastic material fits into said recess.

5. A set comprising the assembly according to claim 1, and a tool for applying ultrasonic vibration energy to the thermoplastic material.

6. Method for attachment of a dental superstructure to an abutment comprising the following steps:
    providing an assembly according to claim 1;
    positioning the assembly parts and a dental implant with contact of the separate connecting piece having thermoplastic material capable of being liquefied by means of mechanical vibration to the first attachment structure or respectively to the first and second attachment structure,
    applying mechanical vibration to the separate connecting piece having thermoplastic material under conditions sufficient for liquefaction and for flowing of the liquefied material, and
    re-solidification of the liquefied material forming a positive fit connection to the first and second undercut of the first and second attachment structure.

7. Method according to claim 6, wherein the first or the first and second undercut to be filled by the liquefied material is designed to prevent after re-solidification a relative movement of the dental superstructure and the abutment.

\* \* \* \* \*